Figure 1:
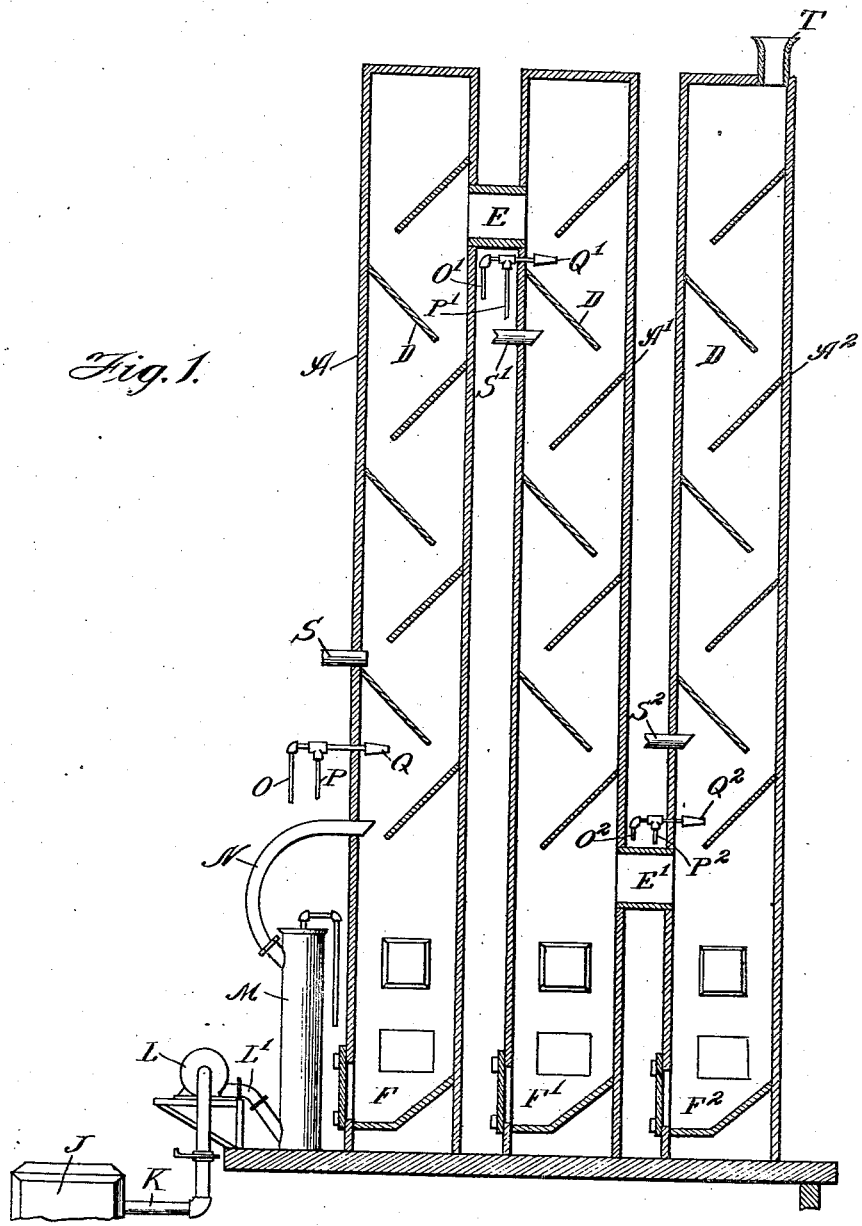

H. J. CALDWELL & J. R. BARR.
APPARATUS FOR BLEACHING GRAIN.
APPLICATION FILED MAY 7, 1907.

908,391.

Patented Dec. 29, 1908.

3 SHEETS—SHEET 1.

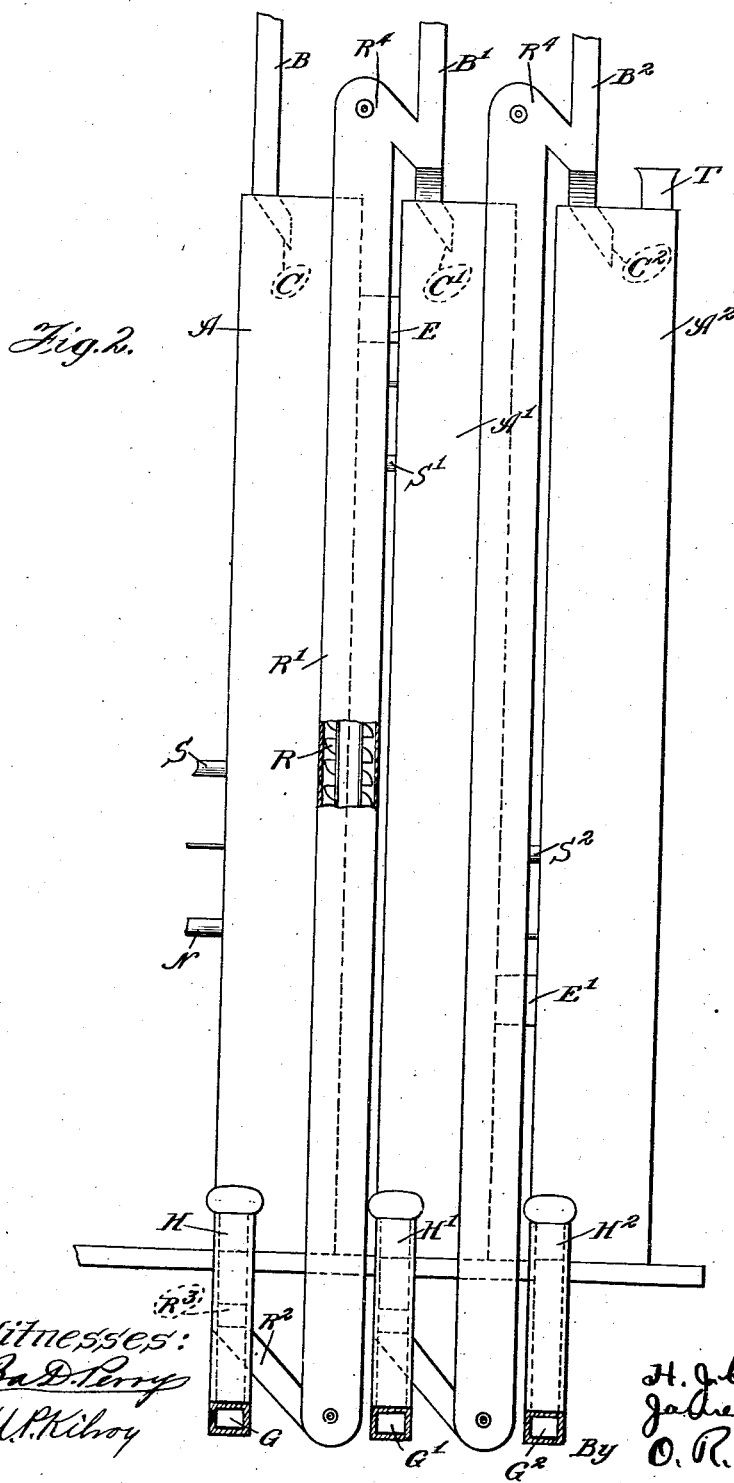

H. J. CALDWELL & J. R. BARR.
APPARATUS FOR BLEACHING GRAIN.
APPLICATION FILED MAY 7, 1907.
908,391.
Patented Dec. 29, 1908.
3 SHEETS—SHEET 3.
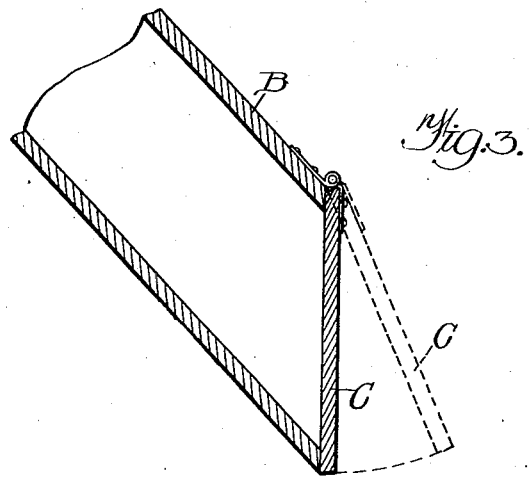
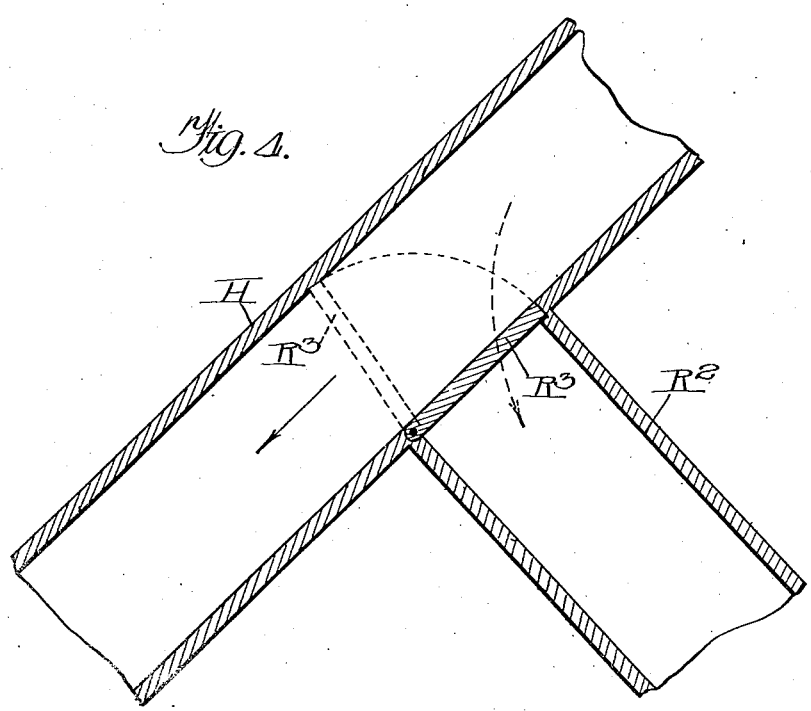

UNITED STATES PATENT OFFICE.

HARRY J. CALDWELL AND JAMES R. BARR, OF EARL PARK, INDIANA.

APPARATUS FOR BLEACHING GRAIN.

No. 908,391.　　　　Specification of Letters Patent.　　　Patented Dec. 29, 1908.

Application filed May 7, 1907. Serial No. 372,296.

*To all whom it may concern:*

Be it known that we, HARRY J. CALDWELL and JAMES R. BARR, citizens of the United States, residing at Earl Park, in the county of Benton and State of Indiana, have invented certain new and useful Improvements in Apparatus for Bleaching Grain, of which the following is a specification.

Our invention relates to the art of purifying, conditioning or, as it is sometimes called "bleaching" grain and to apparatus for practicing said art.

The present invention has for its object in particular to provide a new and improved form of apparatus which shall be adapted to be used in different ways on grains requiring different kinds of treatment, whereby an economy of time, of effort in handling the grain, and of material used for cleaning the same is obtained.

It is well known in this art that grain which has become musted, smutted, rusted, mildewed, stained or otherwise superficially affected may be cleansed or purified by subjecting it to the treatment of the fumes of sulfur, for example, when in moist condition. This treatment has been heretofore effected by passing the grain through a single stack of considerable height into which is admitted sulfur fumes and moisture either in the form of steam or water, or both.

It is well known that grains of various sorts may be advantageously treated in the manner above indicated, but the duration and other incidents of treatment may and should be varied very considerably according to the particular sort of grain to be treated and according to the extent to which it may be affected by the rust, smut or other superficial impurity.

Our present invention contemplates a form of apparatus which shall consist of a plurality of stacks suitably connected together, so that the grain may be passed through several or all of the stacks in succession where heavy treatment is required; or several lots of grain may be passed through single stacks or groups of stacks in multiple streams as it were; the stacks communicating with each other so that the fumes may be passed through the entire system of stacks, thus utilizing the fumes to their fullest extent and keeping the plant in full operation in the most advantageous manner according to the nature of the grain being handled. A very considerable saving of time, effort and material may be obtained thereby.

Our invention has for a further object to control and vary the temperature in a stack or stacks by injecting into the same a cooling stream or streams of air.

The invention is illustrated in the accompanying drawings, wherein—

Figure 1 is a vertical section through one form of apparatus consisting of three stacks; and Fig. 2 is an elevation of the apparatus with parts shown in section. Fig. 3 is a vertical, sectional view of one of the valves C, C', C². Fig. 4 is a vertical, sectional view of one of the valves R³.

Like letters of reference indicate like parts in the several figures of the drawings.

A, A', A² represent three stacks, these stacks being provided at the top with spouts B, B', B² closed by the valves C, C', C². There may be, of course, any number of these stacks. Within the stacks are preferably the cant-boards D forming zig-zag or circuitous passage-ways for the grain. The interior arrangement of the stacks may be of any desired form, as that forms no part of the present invention.

Stack A is connected with A' by a passage-way E and A' and A² by a passage-way E'. At the bottom the stacks are provided with the hoppers F, F', F² from which lead the chutes or discharges G, G', G² respectively, the discharge through which may be controlled by the slides H, H', H².

J is the fumes furnace in which the sulfur fumes or other chemical for treating the grain is generated. The fumes are conducted into stack A by any suitable means. We have shown a pipe K to which is connected a fan L, the eduction pipe L' of which communicates with a tank or other receptacle M in which the fumes may be cooled and, if desired, saturated with moisture. From this tank leads an inlet pipe N which extends into the stack A.

Water and steam may be injected into the stack A from the water pipe O and steam pipe P through the nozzle Q. The same provision may be made for the other stacks or they may receive their moisture by means of the circulation between the several stacks. In the drawings I have shown the stack A' provided with a water pipe O', the steam pipe P' and nozzle Q'; stack A² likewise is provided with water pipe O², steam pipe P² and nozzle Q².

In order that the grain may be made to pass through the different stacks in succession, when that is desired, some form of conveying apparatus is utilized between the grain discharges of the stacks and the inlet spouts of the next succeeding stacks. Any form of conveying machinery may be used. We have shown, for purposes of illustration, in connection with the discharge chute of the stack A a bucket conveyer R running in a shaft R', the buckets being fed by a spout R² which projects from the grain discharge G, the opening into the branch chute being controlled by a valve R³ which serves to close either the branch pipe or the grain discharge. The conveyer discharges into a chute R⁴ which connects with the grain inlet B' of the stack A'. A similar conveying system may be utilized to convey the grain from the discharge chute G' to the inlet of stack A². The last stack is provided with an exhaust T through which the fumes escape.

It will be seen that by means of the valves R³ the conveying devices may be cut in or out of the system. When the grain requires treatment of considerable duration, by turning the valves R³ so as to open the passageways R² and then setting the conveyers in motion, the grain which is fed in through inlet B may be made to pass in succession through several or all of the stacks. The fumes, properly saturated with moisture, will pass up through stack A, into stack A' by passage E, down through A' and into A², through passage E' and thence through the exhaust.

When the grain does not need such heavy treatment, it may be fed simultaneously into the several stacks, the fumes following the same path as before indicated. Apparatus thus constructed obviously has great flexibility. The fumes may be utilized to the utmost. The entire system or battery of stacks may be kept in operation all the time no matter what the particular treatment of the grain may be. This capacity for adjustment to meet varying conditions results in a very practical advantage.

We also provide means for regulating the temperature of the several stacks. To this end stack A is provided with a pipe S which is connected with a suitable supply of cold air under pressure. The stacks A' and A² may also have similar air pipes S' and S². It will be seen, therefore, that by this means the temperature in the stacks, whether they are used singly or in series, may be varied at will. It will be understood that the fumes are ordinarily more or less hot and it is desirable to keep the grain at certain temperatures according to the sort of treatment which it is receiving.

We wish it to be understood that we do not desire to limit ourselves to the particular devices and arrangements shown in the drawings and described in the specification, as obvious modifications will occur to persons skilled in the art.

We have used the term inlet pipe in the claims to denote the pipe, hopper, or other device by means of which the grain is introduced into the stacks. It is not intended to confine the claims to a narrow signification of the word.

We claim:

1. In apparatus of the character described, the combination with a plurality of stacks having circuitous passages therein through which the grain passes by gravity, each of said stacks having a grain inlet at the top and a discharge outlet at the bottom, means for introducing into the stacks treating substances in vaporous form, means for conveying the grain from the outlet of one stack to the inlet of the next stack, and means for cutting said conveying means out of operation and opening the discharge outlets of the stacks, whereby the stacks may be operated at will in series on a single lot of grain or in multiple on separate lots of grain, substantially as described.

2. In apparatus of the character described, the combination with a plurality of stacks having circuitous passages therein through which the grain passes by gravity, each of said stacks having a grain inlet at the top and a discharge outlet at the bottom, means for introducing into the first of said stacks treating substances in vaporous form, said stacks being connected by passage-ways, means for conveying the grain from the outlet of one stack to the inlet of the next stack, and means for cutting said conveying means out of operation and opening the discharge outlets of the stacks, substantially as described.

3. In apparatus of the character described, the combination with a plurality of stacks having circuitous passages therein through which the grain passes by gravity, each of said stacks having a grain inlet at the top and a discharge outlet at the bottom, means for introducing treating fumes into the first of said stacks, the stacks being connected together by passage-ways, means for introducing moisture into the subsequent stacks of the series, means for conveying the grain from the outlet of the first stack into the next stack and so on throughout the series of stacks, and means for cutting said conveying means out of operation and opening the discharge outlets of the stacks, substantially as described.

4. In apparatus of the character described, the combination with a plurality of stacks having circuitous passages therein through which the grain passes by gravity, each of said stacks having an inlet at the top and a discharge outlet at the bottom, means for introducing fumes into the first of said stacks, the stacks being connected together by passage-ways, means for introducing moisture and cool air into the subsequent stacks of the series, means for conveying the grain from the outlet of the first stack to the inlet of the next stack and so on throughout the series of stacks, and means for cutting said conveying means out of operation and opening the discharge outlets of the stacks, substantially as described.

HARRY J. CALDWELL.
JAMES R. BARR.

Witnesses:
WILL W. WILSON,
WILLIAM BARR.